US012603408B2

(12) United States Patent
Jeon

(10) Patent No.: US 12,603,408 B2
(45) Date of Patent: Apr. 14, 2026

(54) CAVITY FILTER FOR RADIO FREQUENCY WIRELESS COMMUNICATION

(71) Applicant: NEXWAVE INC., Daejeon (KR)

(72) Inventor: Jin-Wan Jeon, Daejeon (KR)

(73) Assignee: NEXWAVE INC., Daejeon (KR)

( * ) Notice: Subject to any disclaimer, the term of this patent is extended or adjusted under 35 U.S.C. 154(b) by 267 days.

(21) Appl. No.: 18/379,183

(22) Filed: Oct. 12, 2023

(65) Prior Publication Data

US 2024/0128624 A1 Apr. 18, 2024

(30) Foreign Application Priority Data

Oct. 13, 2022 (KR) ........................ 10-2022-0131030

(51) Int. Cl.

| | |
|---|---|
| ***H01P 1/207*** | (2006.01) |
| ***H01P 1/208*** | (2006.01) |
| ***H01P 3/12*** | (2006.01) |

(52) U.S. Cl.

CPC ............ *H01P 1/207* (2013.01); *H01P 1/2084* (2013.01); *H01P 3/12* (2013.01)

(58) Field of Classification Search

CPC ........... H01P 1/2084; H01P 3/12; H01P 1/207
USPC .................................................. 333/207–212
See application file for complete search history.

(56) References Cited

U.S. PATENT DOCUMENTS

| | | | | |
|---|---|---|---|---|
| 9,887,442 B2 * | 2/2018 | Lim | H01P 1/2053 | |
| 2012/0105176 A1 * | 5/2012 | Kapfinger | H01P 1/2053 | 333/209 |

FOREIGN PATENT DOCUMENTS

| | | |
|---|---|---|
| KR | 10-1179971 | 9/2012 |
| KR | 10-1783954 | 11/2017 |
| KR | 10-2022-0054060 | 5/2022 |

* cited by examiner

*Primary Examiner* — Rakesh B Patel
(74) *Attorney, Agent, or Firm* — PnK IP LLC

(57) ABSTRACT

A cavity filter for RF wireless communication is proposed. The cavity filter includes a filter housing provided in a form of a box that is open at a top thereof, and including a bottom plate and a side plate extending upwards from an outer end of the bottom plate, a plurality of resonance elements arranged on the bottom plate provided on the filter housing, and a PCB cover connected to the side plate provided on the filter housing to cover a top of the filter housing, and including a plurality of electrode patterns formed over the plurality of resonance elements to adjust design frequency characteristics, thus allowing the frequency band of the cavity filter to be finely adjusted.

17 Claims, 9 Drawing Sheets

CAVITY FILTER FOR RADIO FREQUENCY WIRELESS COMMUNICATION

CROSS REFERENCE TO RELATED APPLICATION

This application claims priority from and the benefit of Korean Patent Application No. 10-2022-0131030, filed on Oct. 13, 2022, which is hereby incorporated by reference for all purposes as if fully set forth herein.

BACKGROUND

Field

The present disclosure relates to a cavity filter for RF wireless communication, which includes a plurality of resonance elements arranged in a filter housing and a PCB cover covering the top of the filter housing, includes a plurality of electrode patterns on the PCB cover, includes a corresponding electrode corresponding to the upper portion of the resonance element, a ground electrode electrically connected to the housing and a plurality of split electrodes between the corresponding electrode and the ground electrode, and electrically connects at least one of the plurality of split electrodes to any one of the corresponding electrode and the ground electrode, thus allowing a frequency band of the cavity filter to be finely adjusted.

Discussion of the Background

As is well known, an RF filter is a component that passes only a desired frequency band among various frequency components of an input wireless signal and attenuates or reflects the remaining frequencies. Such an RF filter is known to be an essential component for selecting a frequency used in an RF wireless communication system.

The RF filter may be provided individually, as an accessory part, or in the form of a matching circuit across a passive circuit, an active circuit, a system, etc. In all forms, the RF filter is an essential component in which a frequency filtering concept is required in any form or location.

Further, the RF filter may include a cavity filter using a waveguide, a ceramic filter using a ceramic material, an LC filter using an inductor and a capacitor element, and a SAW filter using a surface elastomer, depending on the implementation method and material.

Meanwhile, the cavity filter is mainly used in a 5G base station system because high output characteristics are critical. Such a system has low electrical loss and high frequency selectivity and requires mechanical characteristics such as small volume and high-temperature stability.

In addition, it is necessary to adjust a specification through frequency band tuning for characteristics that have errors compared to design due to a manufacturing or assembly tolerance when the filter is manufactured. The technique of implementing the tuning method becomes an important issue in determining price competitiveness in mass production.

The above information disclosed in this Background section is only for understanding of the background of the inventive concepts, and, therefore, it may contain information that does not constitute prior art.

SUMMARY

Accordingly, the present disclosure has been made keeping in mind the above problems occurring in the related art, and an objective of the present disclosure is to provide a cavity filter for RF wireless communication, which includes a plurality of resonance elements arranged in a filter housing and a PCB cover covering the top of the filter housing, includes a plurality of electrode patterns on the PCB cover, includes a corresponding electrode corresponding to the upper portion of the resonance element, a ground electrode electrically connected to the housing and a plurality of split electrodes between the corresponding electrode and the ground electrode, and electrically connects at least one of the plurality of split electrodes to any one of the corresponding electrode and the ground electrode, thus allowing a frequency band of the cavity filter to be finely adjusted.

The objectives of the present disclosure are not limited to the above-mentioned objective, and other objectives of the present disclosure that are not mentioned can be understood from the following description by those skilled in the art.

Additional features of the inventive concepts will be set forth in the description which follows, and in part will be apparent from the description, or may be learned by practice of the inventive concepts.

The present disclosure provides a cavity filter for RF wireless communication, the cavity filter including a filter housing provided in a form of a box that is open at a top thereof, and including a bottom plate and a side plate extending upwards from an outer end of the bottom plate, a plurality of resonance elements arranged on the bottom plate provided on the filter housing, and a PCB cover connected to the side plate provided on the filter housing to cover a top of the filter housing, and including a plurality of electrode patterns formed over the plurality of resonance elements to adjust design frequency characteristics.

The PCB cover may include a lower substrate provided on an upper portion of the filter housing, a first corresponding electrode provided on a lower surface of the lower substrate to be spaced apart from the resonance element, a first ground electrode provided on the lower surface of the lower substrate while being outside the first corresponding electrode to be spaced apart therefrom, and electrically connected to the filter housing, a second corresponding electrode provided on an upper surface of the lower substrate to be electrically connected to the first corresponding electrode, a plurality of first split electrodes provided on the upper surface of the lower substrate while being outside the second corresponding electrode to be spaced apart therefrom, a second ground electrode provided on the upper surface of the lower substrate while being outside the plurality of first split electrodes to be spaced apart therefrom, and electrically connected to the first ground electrode, an upper substrate provided on the lower substrate and provided on an upper surface of the second ground electrode, a third ground electrode provided on an upper surface of the upper substrate and electrically connected to the first ground electrode and the second ground electrode, and a cover provided on the third ground electrode to cover a structure.

The lower substrate and the upper substrate may be integrally provided on the upper portion of the filter housing.

The PCB cover may include a multilayered substrate provided on an upper portion of the filter housing, a first corresponding electrode provided on a lower surface of the multilayered substrate to be spaced apart from the resonance element, a first ground electrode provided on the lower surface of the multilayered substrate while being outside the first corresponding electrode to be spaced apart therefrom and electrically connected to the filter housing, a second corresponding electrode provided as an inner layer of the multilayered substrate to be electrically connected to the first corresponding electrode, a plurality of first split electrodes provided as the inner layer of the multilayered substrate while being outside the second corresponding electrode to be spaced apart therefrom, a second ground electrode provided as the inner layer of the multilayered substrate while being outside the plurality of first split electrodes to be spaced apart therefrom and electrically connected to the first ground electrode, a third corresponding electrode provided on an upper surface of the multilayered substrate and electrically connected to the second ground electrode, a plurality of second split electrodes provided on the upper surface of the multilayered substrate while being outside the third corresponding electrode to be spaced apart therefrom and electrically connected to the plurality of first split electrodes, a third ground electrode provided on the upper surface of the multilayered substrate and electrically connected to the first ground electrode and the second ground electrode, and a cover provided on the third ground electrode to cover a structure.

At least one of the plurality of first split electrodes may be electrically connected to the second corresponding electrode.

At least one of the plurality of first split electrodes may be electrically connected to the second ground electrode.

The plurality of first split electrodes may have different electrode sizes to adjust a frequency band.

The PCB cover may be configured such that a first gap between the second corresponding electrode and the plurality of first split electrodes is different from a second gap between the plurality of first split electrodes and the second ground electrode so as to adjust a movement width of the frequency band.

The PCB cover may include a bridge pattern that connects the upper regions of the plurality of resonance elements.

At least one of the plurality of second split electrodes may be electrically connected to the third corresponding electrode.

At least one of the plurality of second split electrodes may be electrically connected to the third ground electrode.

The plurality of second split electrodes may have different electrode sizes to adjust a frequency band.

The plurality of second split electrodes may have a different size from the first split electrodes for electrode connection.

The PCB cover may be configured such that a third gap between the third corresponding electrode and the plurality of second split electrodes and a fourth gap between the plurality of second split electrodes and the third ground electrode are provided differently from the first gap between the second corresponding electrode and the plurality of first split electrodes and the second gap between the plurality of first split electrodes and the second ground electrode so as to adjust the movement width of the frequency band.

The PCB cover may be configured such that a third gap between the third corresponding electrode and the plurality of second split electrodes may be different from a fourth gap between the plurality of second split electrodes and the third ground electrode.

The present disclosure is advantageous in that a cavity filter for RF wireless communication includes a plurality of resonance elements arranged in a filter housing and a PCB cover covering the top of the filter housing, includes a plurality of electrode patterns on the PCB cover, includes a corresponding electrode corresponding to the upper portion of the resonance element, a ground electrode electrically connected to the housing and a plurality of split electrodes between the corresponding electrode and the ground electrode, and electrically connects at least one of the plurality of split electrodes to any one of the corresponding electrode and the ground electrode, thus allowing a frequency band of the cavity filter to be finely adjusted.

It is to be understood that both the foregoing general description and the following detailed description are illustrative and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate illustrative embodiments of the invention, and together with the description serve to explain the inventive concepts.

DETAILED DESCRIPTION

Figure 1:
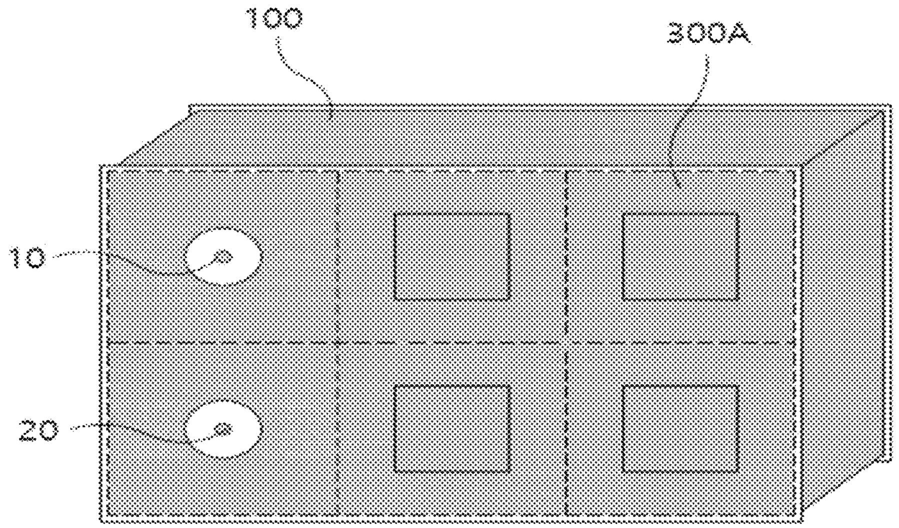
FIG. 1 is a diagram illustrating a cavity filter for RF wireless communication according to an embodiment of the present disclosure.

In the following description, for the purposes of explanation, numerous specific details are set forth in order to provide a thorough understanding of various embodiments or implementations of the invention. As used herein "embodiments" and "implementations" are interchangeable words that are non-limiting examples of devices or methods employing one or more of the inventive concepts disclosed herein. It is apparent, however, that various embodiments may be practiced without these specific details or with one or more equivalent arrangements. In other instances, well-known structures and devices are shown in block diagram form in order to avoid unnecessarily obscuring various embodiments. Further, various embodiments may be different, but do not have to be exclusive. For example, specific shapes, configurations, and characteristics of an embodiment may be used or implemented in another embodiment without departing from the inventive concepts.

Unless otherwise specified, the illustrated embodiments are to be understood as providing illustrative features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Hereafter, embodiments of the present disclosure will be described in detail with reference to the accompanying drawings.

FIG. 1 is a diagram illustrating a cavity filter for RF wireless communication according to an embodiment of the present disclosure, FIGS. 2 to 5 are diagrams illustrating the configuration of each layer of the cavity filter for the RF wireless communication according to an embodiment of the present disclosure.

Further, FIGS. 6 to 16 are diagrams illustrating various examples of the cavity filter for the RF wireless communication according to an embodiment of the present disclosure.

Figure 2:
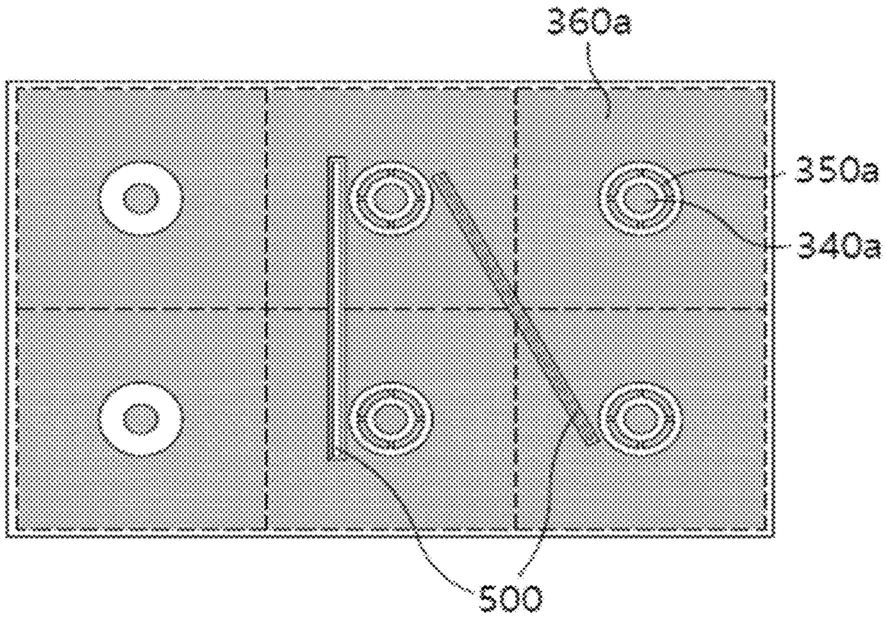
FIG. 2 is a plan view of an embodiment of an upper substrate of PCB cover of the cavity filter shown in FIG. 1.
Figure 3:
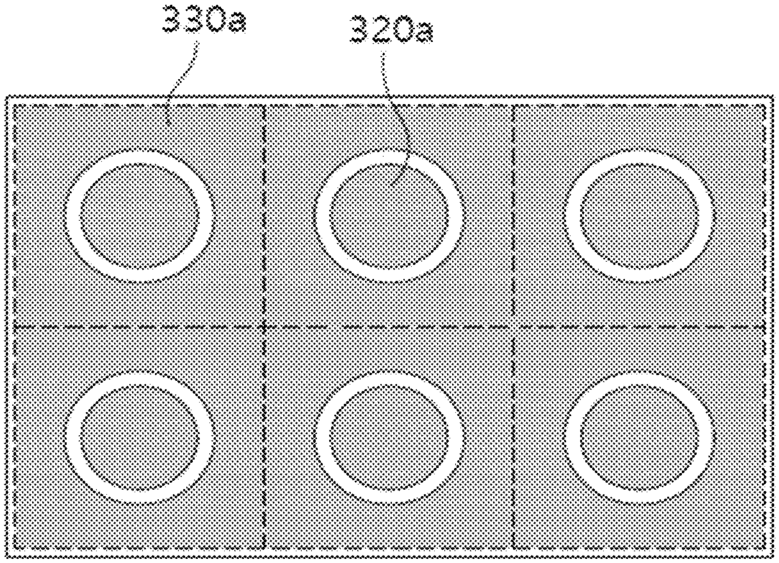
FIG. 3 is a plan view of an embodiment of a lower substrate of PCB cover of the cavity filter shown in FIG. 1.
Figure 4:
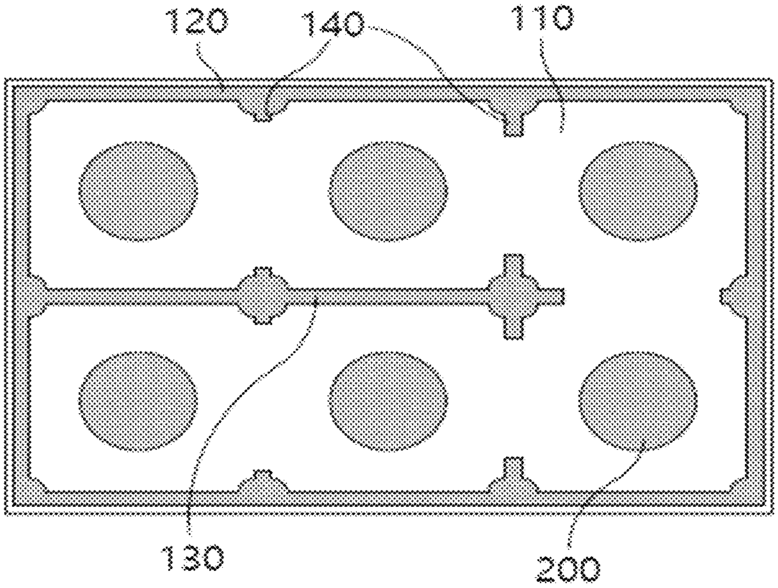
FIG. 4 is a plan view of an embodiment of a filter housing of the cavity filter shown in FIG. 1.
Figure 5:
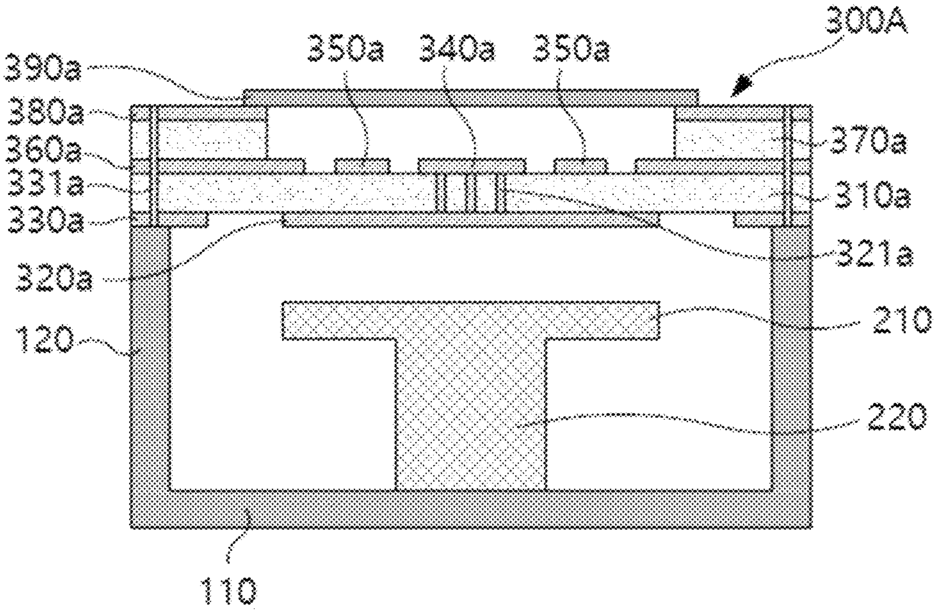
FIG. 5 is a cross-sectional view of an embodiment of the cavity filter shown in FIG. 1.
Figure 6:
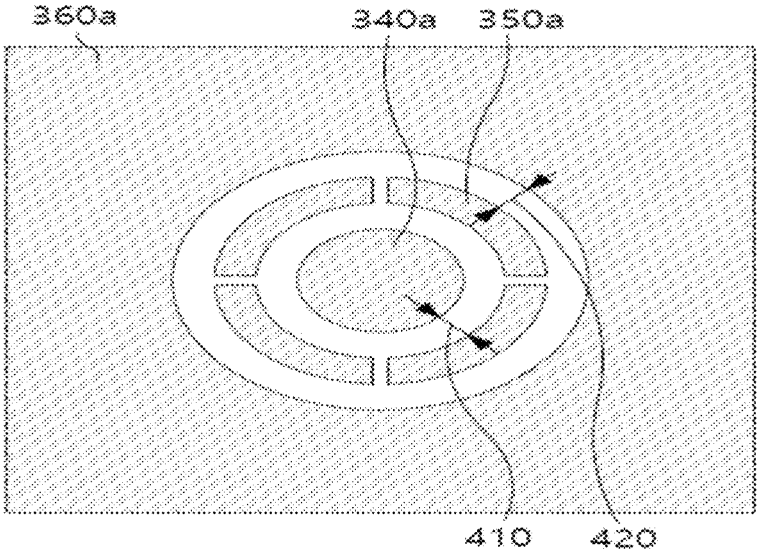
FIG. 6 is a plan view of an embodiment of a specific area of the upper substrate of PCB cover shown in FIG. 2.
Figure 9:
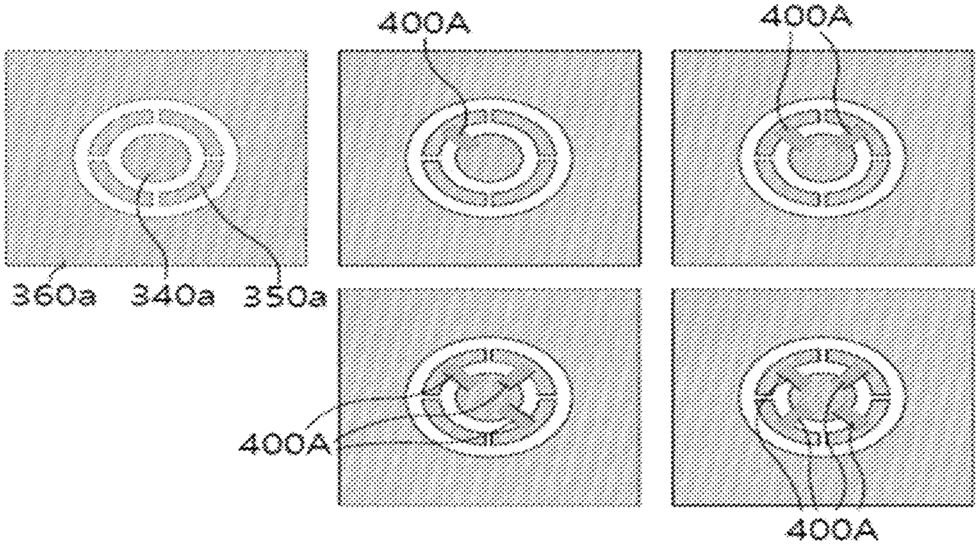
Figure 10:
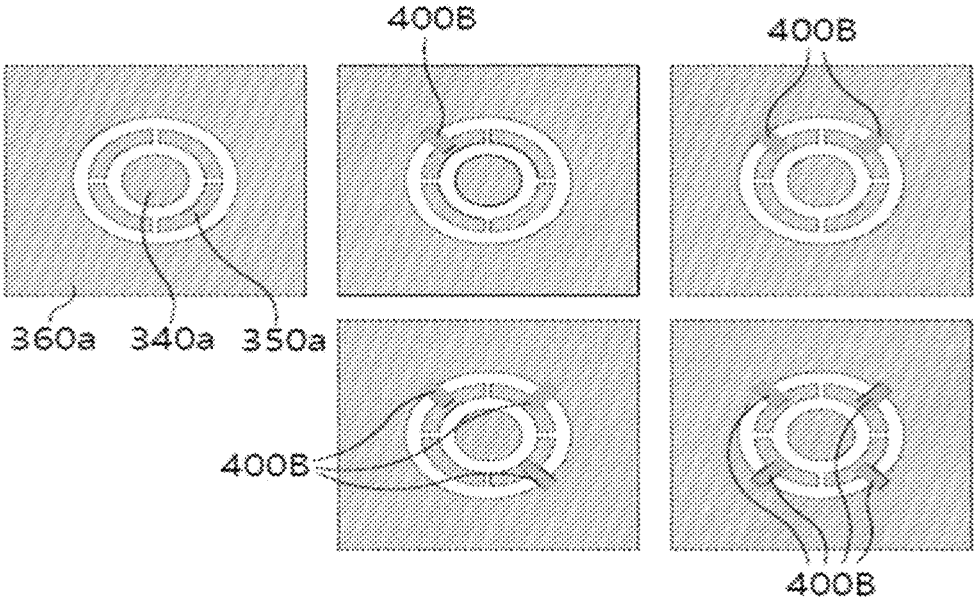
Figure 11:
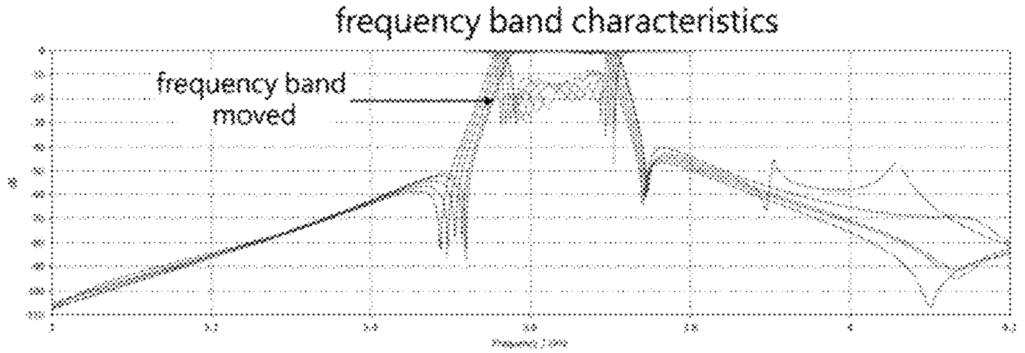
FIGS. 11 and 12 are graphs showing graph showing the result of adjusting the frequency band characteristics of the cavity filter shown in FIG. 1.
Figure 12:
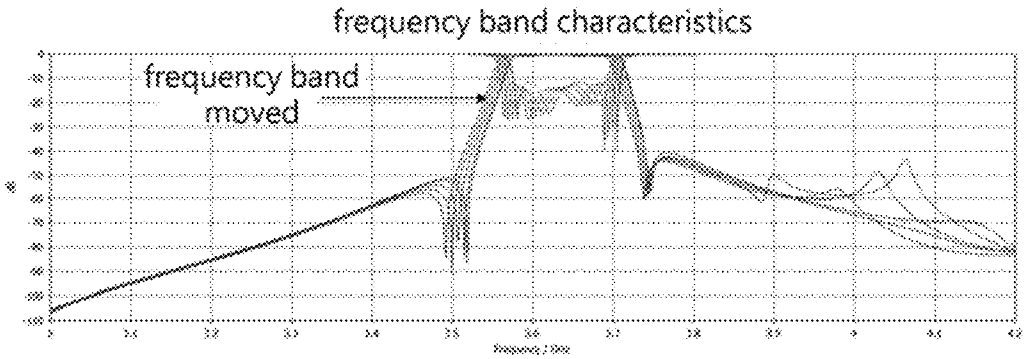
Figure 13:
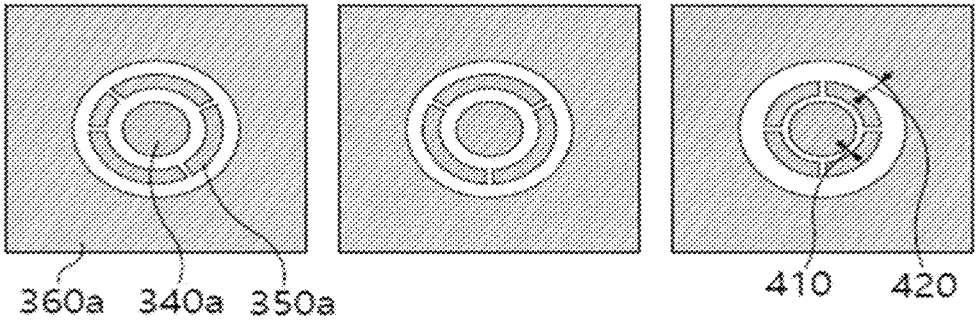
FIGS. 13 and 14 are plan views of other embodiments of a specific area of the upper substrate of PCB cover.
Figure 14:
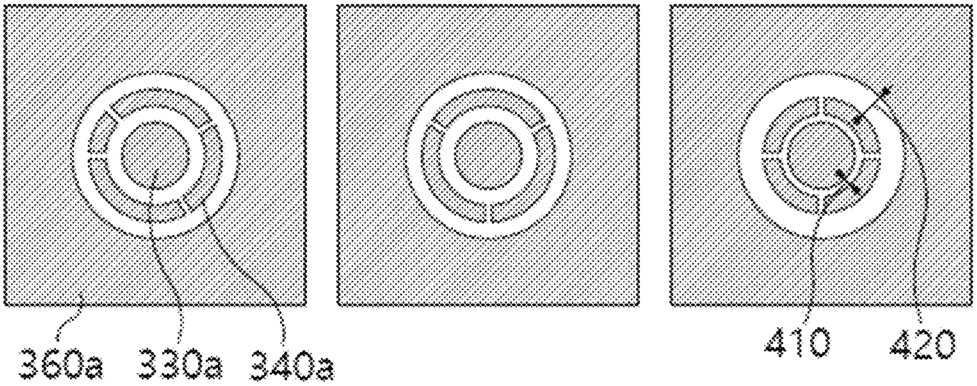
Figure 15:
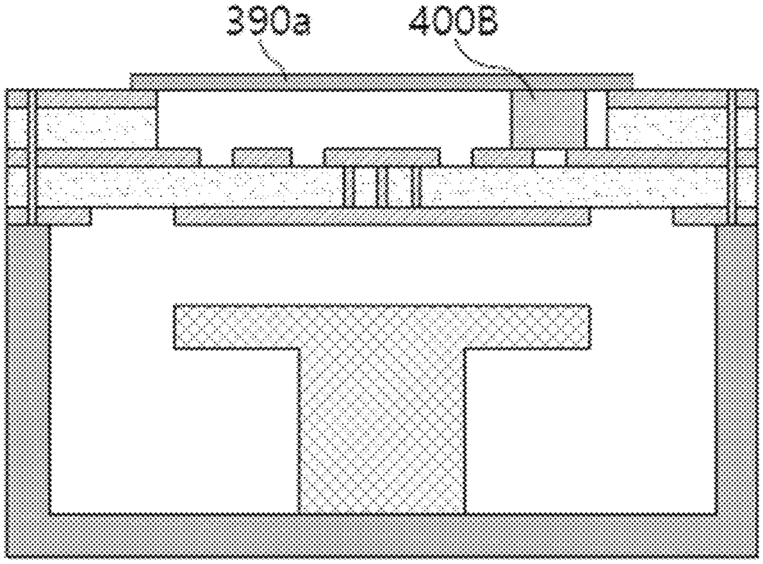
FIGS. 15 and 16 are cross-sectional views of other embodiments of the cavity filter shown in FIG. 1.
Figure 16:
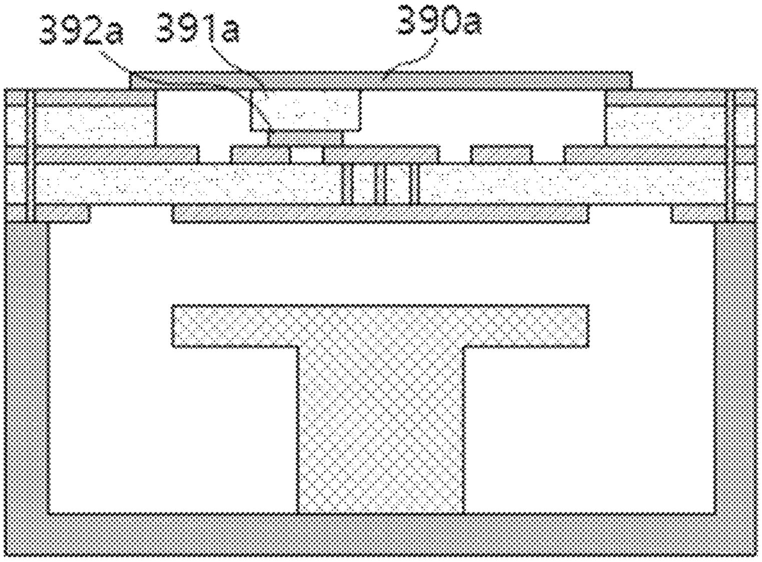

Specifically, FIG. 2 is a plan view of an embodiment of an upper substrate of PCB cover of the cavity filter shown in FIG. 1, FIG. 3 is a plan view of an embodiment of a lower substrate of PCB cover of the cavity filter shown in FIG. 1, FIG. 4 is a plan view of an embodiment of a filter housing of the cavity filter shown in FIG. 1, FIG. 5 is a cross-sectional view of an embodiment of the cavity filter shown in FIG. 1, FIG. 6 is a plan view of an embodiment of a specific area of the upper substrate of PCB cover shown in FIG. 2, FIGS. 7 to 10 are cross-sectional views and plan views of other embodiments of the cavity filter shown in FIG. 1, FIGS. 11 and 12 are graphs showing graph showing the result of adjusting the frequency band characteristics of the cavity filter shown in FIG. 1, FIGS. 13 and 14 are plan views of other embodiments of a specific area of the upper substrate of PCB cover, and FIGS. 15 and 16 are cross-sectional views of other embodiments of the cavity filter shown in FIG. 1.

Referring to FIGS. 1 to 16, the cavity filter for the RF wireless communication according to an embodiment of the present disclosure may include a filter housing 100, a plurality of resonance elements 200 shown in FIG. 4, and a PCB cover 300A.

Referring to FIG. 4, the filter housing 100 may be provided in the form of a box that is open at a top thereof, and may include a bottom plate 110 and a side plate 120 extending upwards from the outer end of the bottom plate 110.

Such a filter housing 100 may be provided with a partition plate 130 to correspond to the arrangement of the plurality of resonance elements 200, and may be configured such that division protrusions 140 are formed on the inner surface of the side plate 120 and the outer surface of the partition plate 130 in each of spaces where the plurality of resonance elements 200 are arranged.

Here, the filter housing 100 may separate spaces through the partition plate 130 and the division protrusion 140, and one resonance element 200 may be disposed in each space. A resonant frequency may be determined depending on the size of each space and the disposed resonance element 200, thereby determining the passband of the filter.

In addition, referring to FIG. 1, the filter housing 100 may serve as a filter that allows only electromagnetic waves in a specific frequency band to pass therethrough, because the electromagnetic waves move from an input port 10 to an output port 20 to an adjacent space connected through the partition plate 130 and the division protrusion 140. An electromagnetic-wave signal may be input at a location of the input port 10, propagate through a space between the side plate 120 and the partition plate 130, and then be output at a location of the output port 20.

Of course, according to an embodiment of the present disclosure, as shown in FIG. 1, the input port 10 is located in an upper portion of a left side, the input electromagnetic wave signal moves from the upper portion of the left side to the upper portion of a right side and then moves from the upper portion of the right side to the lower portion of the right side, moves from the lower portion of the right side to a lower portion of the left side, and then is output through the output port 20 located in the lower portion of the left side. In this way, the electromagnetic wave signal is described as moving clockwise. However, the locations of the input port 10 and the output port 20 may be set to be opposite to the locations of an embodiment of the present disclosure in a vertical direction or a horizontal direction.

Referring to FIG. 5, the plurality of resonance elements 200 is disposed on the bottom plate 110 provided in the filter housing 100. For example, each resonance element may include a resonance element head 210 with a relatively larger diameter and a cylindrical post 220 that extends downwards from the resonance element head 210 and is attached to the bottom plate 110. Each resonance element may be made of a metal or a metal alloy.

Although the plurality of resonance elements 200 is described as having six in an embodiment of the present disclosure, less than or more than six resonance elements may be provided depending on the required electrical characteristics of the filter.

Referring to FIGS. 1 and 5, the PCB cover 300A may be coupled to the side plate 120 provided on the filter housing 100 to cover the top of the filter housing 100, and may have a plurality of electrode patterns formed over the plurality of resonance elements 200 to adjust design frequency characteristics. Referring to FIGS. 3 and 4, the PCB cover may include a lower substrate 310*a*, a first corresponding electrode 320*a*, a first ground electrode 330*a*, a second corresponding electrode 340*a*, a plurality of first split electrodes 350*a*, a second ground electrode 360*a*, an upper substrate 370*a*, a third ground electrode 380*a*, and a cover 390*a*.

Here, referring to FIGS. 3 and 5, in an area where the input port 10 of FIG. 1 and the output port 20 of FIG. 1 connected to an external terminal are located, the first corresponding electrode 320*a* may be disposed above the resonance element 200 to be spaced apart therefrom by a preset distance. The first corresponding electrode 320*a* and the input port 10 or the output port 20 may be electrically connected through a plurality of first connection via holes 321*a*.

For example, referring to FIGS. 5 and 6, the lower substrate 310*a* may be provided on the upper portion of the filter housing 100, the first corresponding electrode 320*a* may be provided on the lower surface of the lower substrate 310*a* to be spaced apart from the resonance element 200, the first ground electrode 330*a* may be provided on the lower surface of the lower substrate 310*a* while being outside the first corresponding electrode 320*a* to be spaced apart therefrom and may be electrically connected to the filter housing 100, and the second corresponding electrode 340*a* may be provided on the upper surface of the lower substrate 310*a* to be electrically connected to the first corresponding electrode 320*a*.

In this regard, the first corresponding electrode 320*a* having a size corresponding to that of the resonance element head 210 may be located above the resonance element head 210 to be spaced apart therefrom by a preset distance, the second corresponding electrode 340*a* may be located on the upper surface of the lower substrate 310*a*, and the second corresponding electrode 340*a* may be electrically connected to the first corresponding electrode 320*a* through one or more first connection via holes 321*a*.

The plurality of first split electrodes 350*a* may be provided on the upper surface of the lower substrate 310*a* while being outside the second corresponding electrode 340*a* to be spaced apart therefrom. The second ground electrode 360*a* may be provided on the upper surface of the lower substrate 310*a* while being outside the plurality of first split electrodes 350*a* to be spaced apart therefrom and may be electrically connected to the first ground electrode 330*a*.

In this regard, the plurality of first split electrodes 350*a* may be provided outside the second corresponding electrode 340*a* to be spaced apart therefrom with a first gap 410, and may be provided inside the second ground electrode 360*a* to be spaced apart therefrom with a second gap 420. The first ground electrode 330*a* and the second ground electrode 360*a* may be electrically connected using one or more second connection via holes 331*a*.

The upper substrate 370*a* may be provided on the lower substrate 310*a*, and may be provided on the upper surface of the second ground electrode 360*a*. The third ground electrode 380*a* may be provided on the upper surface of the upper substrate 370*a*, and be electrically connected to the first ground electrode 330*a* and the second ground electrode 360*a*. The cover 390*a* may be provided on the third ground electrode 380*a* to cover a structure, thus serving as shielding to prevent internal electromagnetic waves from being emitted to the outside.

As described above, the lower substrate 310*a* and the upper substrate 370*a* may be integrally provided on the upper portion of the filter housing 100.

Meanwhile, the first connection via hole 321*a* and the second connection via hole 331*a* provided on the PCB cover 300A may serve as the shielding while electrically connecting different electrode layers to each other. In particular, a plurality of second connection via holes 331*a* may be arranged at regular intervals to shield the electromagnetic waves.

Figure 7:
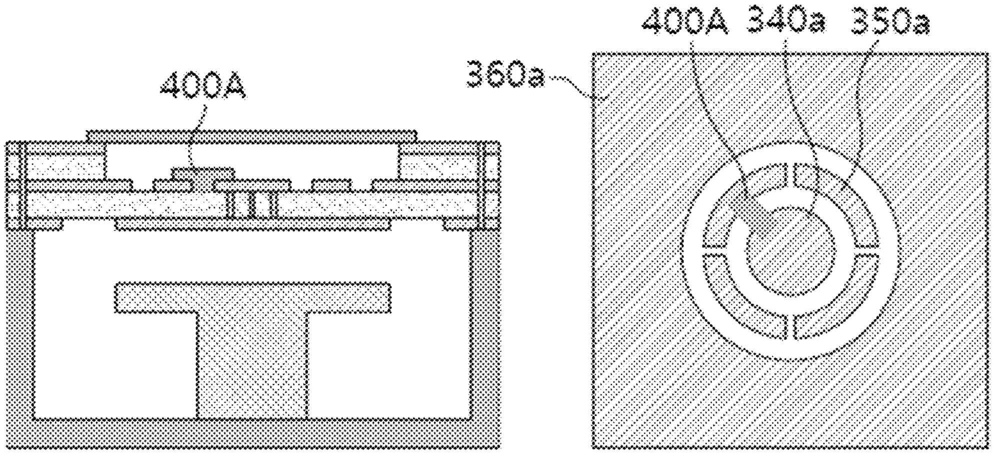
FIGS. 7 to 10 are cross-sectional views and plan views of other embodiments of the cavity filter shown in FIG. 1.
Figure 8:
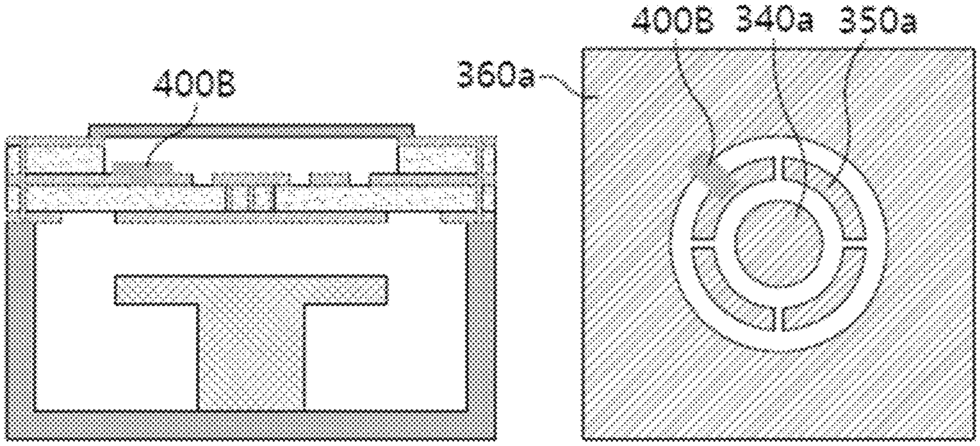

Here, the third ground electrode 380*a* may be electrically connected through the second connection via hole 331*a* to the first ground electrode 330*a* and the second ground electrode 360*a*. In an internal space protected by the cover 390*a*, a first connecting member 400A connecting at least one of the plurality of first split electrodes 350*a* and the second corresponding electrode 340*a* may be provided as shown in FIGS. 7 and 9, and a second connecting member 400B connecting at least one of the plurality of first split electrodes 350*a* and the second ground electrode 360*a* may be provided as shown in FIGS. 8 and 10.

For example, at least one of the plurality of first split electrodes 350*a* may be electrically connected to the second corresponding electrode 340*a*. The first split electrodes may be divided at a uniform angle (size) or at different angles (sizes). At least one of the first split electrodes may be electrically connected to the second corresponding electrode 340*a*, which is provided inside the first split electrode to be spaced apart therefrom by the first gap 410, through the first connecting member 400A.

Further, at least one of the plurality of first split electrodes 350*a* may be electrically connected to the second ground electrode 360*a*. At least one of the first split electrodes may be electrically connected to the second ground electrode 360*a*, which is provided outside the first split electrode to be spaced apart therefrom by the second gap 420, through the second connecting member 400B.

As described above, the first connecting member 400A and the second connecting member 400B may use conductive material so as to connect respective electrodes to each other, for example, use a metal plate or metal wire containing at least one selected from copper, aluminum, and SUS, graphene, carbon nano-tube (CNT), etc., and be provided as conductive tape or conductive paste.

FIG. 11 is a graph showing the result of adjusting the frequency band characteristics of the filter by connecting four first split electrodes 350*a* to the second corresponding electrode 340*a* through the first connecting member 400A. As the result of checking the frequency band characteristics of the filter using electromagnetic simulation, it can be seen that blue indicates passing characteristics, red indicates reflection characteristics, and the frequency characteristics of the filter are finely adjusted depending on the connection status of 0, 1, 2, 3, or 4.

Further, FIG. 12 is a graph showing the result of adjusting the frequency band characteristics of the filter by connecting four first split electrodes 350*a* to the second ground electrode 360*a* through the second connecting member 400B. As the result of checking the frequency band characteristics of the filter using electromagnetic simulation, it can be seen that blue indicates passing characteristics, red indicates reflection characteristics, and the frequency characteristics of the filter are finely adjusted depending on the connection status of 0, 1, 2, 3, or 4.

Meanwhile, the frequency characteristics of the filter may include as design variables the size of a resonator, the size of a resonant space where the resonator is located, a distance between the related resonator and a corresponding electrode pattern, and a distance between the corresponding electrode and the ground electrode. All of them may be manufactured according to design values to determine the characteristics of the filter. However, since tolerances inevitably occur in their physical manufacturing values and assembly process, it is essential to adjust the frequency characteristics finely.

As shown in FIG. 13, by connecting electrically at least one of the plurality of first split electrodes 350*a* to the second corresponding electrode 340*a* using the first connecting member 400A or at least one of the plurality of first split electrodes 350*a* to the second ground electrode 360*a* using the second connecting member 400B, the frequency band characteristics can be finely adjusted. Of course, when the frequency characteristics are accurately fit depending on the design and the tolerance, the first split electrode 350*a* may not be electrically connected to the second corresponding electrode 340*a* or the second ground electrode 360*a*.

Further, the plurality of first split electrodes 350*a* may have different electrode sizes to adjust the frequency band. As shown in FIG. 14, the first split electrodes may be split at different angles (sizes), and at least one of the first split electrodes may be electrically connected to the second corresponding electrode 340*a* or be electrically connected to the second ground electrode 360*a*. When the electrode with a relatively large size (area) is connected, the frequency band may move relatively more greatly. When the electrode with a relatively small size (area) is connected, the frequency band may move relatively more precisely.

Meanwhile, the number of the plurality of first split electrodes 350*a* may be adjusted to control the movement width of the frequency band. After the first split electrodes may be divided into various numbers such as 2, 3, 4, 5, and 6 depending on the movement width of the frequency band that is to be previously designed and adjusted, at least one electrode may be electrically connected to the second corresponding electrode 340*a* or the second ground electrode 360*a*.

In a state where at least one of the plurality of first split electrodes 350*a* is connected to the second corresponding electrode 340*a* through the first connecting member 400A, at least another of the plurality of first split electrodes 350*a* may be connected to the second ground electrode 360*a* through the second connecting member 400B.

In the above-described PCB cover 300A, the first gap 410 between the second corresponding electrode 340*a* and the plurality of first split electrodes 350*a* may be different from the second gap 420 between the plurality of first split electrodes 350*a* and the second ground electrode 360*a* so as to adjust the movement width of the frequency band. The frequency band can be moved relatively more greatly by applying a relatively larger gap. In contrast, the frequency band can be moved relatively more precisely by applying a relatively smaller gap.

Meanwhile, the above-described PCB cover 300A may be provided with a bridge pattern 500 that connects the upper regions of the plurality of resonance elements. Some layers with the corresponding electrodes (e.g. layer having the second corresponding electrode 340*a*) of the PCB cover 300A may be electrically coupled to enhance electrical characteristics.

For example, the bridge pattern 500 may make transmission zero in the pass band of the filter through coupling with the resonance elements 200 in other spaces through the second corresponding electrode 340*a*, thus improving the skirt characteristics of the filter. For example, the bridge pattern 500 may be placed to create coupling between a resonant element in the second or third space by skipping the space provided by the immediately adjacent passage.

As shown in FIG. 15, the above-described PCB cover 300A may be provided with a second connecting member 400B attached to the lower portion of the cover 390*a*, thus electrically connecting at least one of the plurality of split electrodes 350*a* to the second ground electrode 360*a*.

Further, as shown in FIG. 16, the above-described PCB cover 300A may be provided with an insulator 391*a* attached to the lower portion of the cover 390*a* and a connecting member 392*a*, thus electrically connecting at least one of the plurality of split electrodes 350*a* to the second corresponding electrode 340*a*. In this case, as shown in the drawing, the insulator 391*a* should be provided between the cover 390*a* and the connecting member 392*a*.

Of course, as shown in FIGS. 15 and 16, the cover and the connecting member may be configured using any method or different methods.

Therefore, according to an embodiment of the present disclosure, the plurality of resonance elements arranged in the filter housing and the PCB cover covering the top of the filter housing are provided, the plurality of electrode patterns is provided within the PCB cover, the corresponding electrode corresponding to the upper portion of the resonance element, the ground electrode electrically connected to the housing and the plurality of split electrodes between the corresponding electrode and the ground electrode are provided, and at least one of the plurality of split electrodes is electrically connected to any one of the corresponding electrode and the ground electrode, thus allowing the frequency band of the cavity filter to be finely adjusted.

Figure 17:
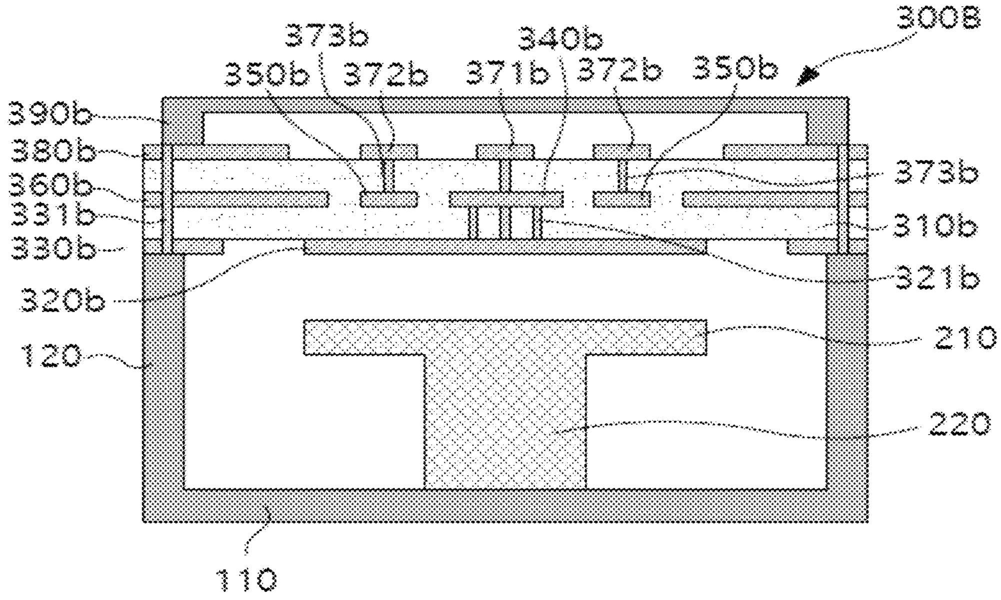
FIGS. 17 and 18 are diagrams illustrating a cavity filter for RF wireless communication according to another embodiment of the present disclosure.
Figure 18:
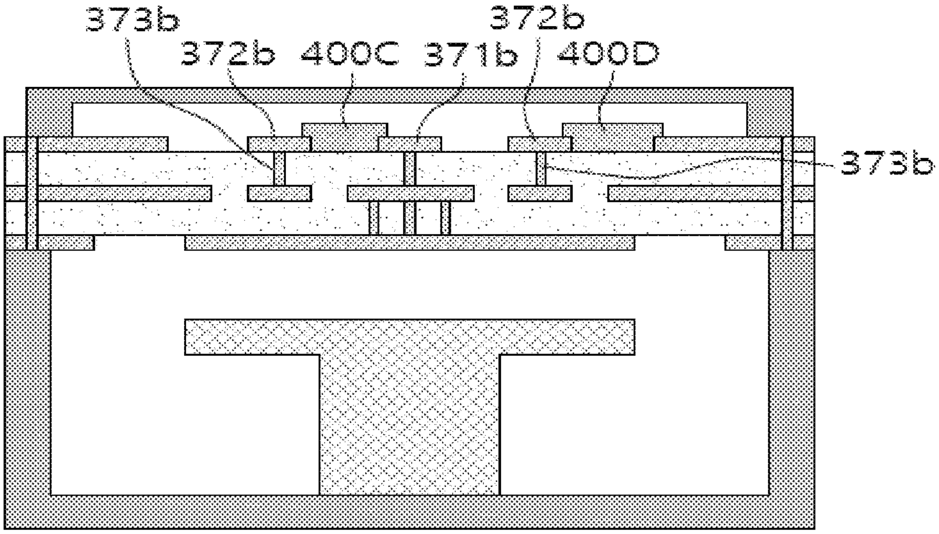

FIGS. 17 and 18 are diagrams illustrating a cavity filter for RF wireless communication according to another embodiment of the present disclosure.

Referring to FIGS. 17 and 18, the cavity filter for the RF wireless communication according to another embodiment of the present disclosure may include a filter housing 100, a plurality of resonance elements 200, and a PCB cover 300B. Since the filter housing 100 and the plurality of resonance elements 200 according to another embodiment of the present disclosure have the same configuration as the filter housing 100 and the plurality of resonance elements 200 according to an embodiment of the present disclosure, a detailed description thereof will be omitted below.

The PCB cover 300B may be coupled to the side plate 120 provided on the filter housing 100 to cover the top of the filter housing 100, and may have a plurality of electrode patterns with the multilayered substrate 310*b* formed over the plurality of resonance elements 200 to adjust design frequency characteristics. The PCB cover may include a multilayered substrate 310*b*, a first corresponding electrode 320*b*, a first ground electrode 330*b*, a second corresponding electrode 340*b*, a plurality of first split electrodes 350*b*, a second ground electrode 360*b*, a third corresponding electrode 371*b*, a second split electrode 372*b*, a third ground electrode 380*b*, and a cover 390*b*.

Here, in an area where the input port 10 and the output port 20 connected to an external terminal are located, the first corresponding electrode 320*b* may be disposed above the resonance element 200 to be spaced apart therefrom by a preset distance. The first corresponding electrode 320*b* and the input port 10 or the output port 20 may be electrically connected through a plurality of first connection via holes 321*b*.

The multilayered substrate 310*b* may be provided on the upper portion of the filter housing 100, the first corresponding electrode 320*b* may be provided on the lower surface of the multilayered substrate 310*b* to be spaced apart from the resonance element 200, the first ground electrode 330*b* may be provided on the lower surface of the multilayered substrate 310*b* while being outside the first corresponding electrode 320*b* to be spaced apart therefrom and may be electrically connected to the filter housing 100, and the second corresponding electrode 340*b* may be provided as the inner layer of the multilayered substrate to be electrically connected to the first corresponding electrode.

In this regard, the first corresponding electrode 320*b* with a size corresponding to that of the resonance element head 210 may be located above the resonance element head 210 to be spaced apart therefrom by a preset distance, the second corresponding electrode 340*b* with a relatively smaller size than the first corresponding electrode 320*b* may be located in the multilayered substrate 310*b* to be above the first corresponding electrode 320*b* while being spaced apart therefrom by a preset distance. The first ground electrode 330*b* may be provided outside the first corresponding electrode 320*b* to surround the first corresponding electrode. The second corresponding electrode 340*b* may be electrically connected to the first corresponding electrode 320*b* through first connection via holes 321*b*.

The plurality of first split electrodes 350*b* may be provided as the inner layer of the multilayered substrate 310*b* while being outside the second corresponding electrode 340*b* to be spaced apart therefrom, and the second ground electrode 360*b* may be provided as the inner layer of the multilayered substrate 310*b* while being outside the plurality of first split electrodes 350*b* to be spaced apart therefrom and may be electrically connected to the first ground electrode 330*b*.

In this regard, the plurality of first split electrodes 350*b* may be provided outside the second corresponding electrode 340*b* to be spaced apart therefrom with a first gap 410, and may be provided inside the second ground electrode 360*b* to be spaced apart therefrom with a second gap 420. The first ground electrode 330*b* and the second ground electrode 360*b* may be electrically connected using second connection via holes 331*b*.

The third corresponding electrode 371*b* may be provided on the upper surface of the multilayered substrate 310*b*, and may be electrically connected to the second corresponding electrode 340*b*. The plurality of second split electrodes 372*b* may be provided on the upper surface of the multilayered substrate 310*b* while being outside the third corresponding electrode 371*b* to be spaced apart therefrom, and may be electrically connected to the plurality of first split electrodes 350*b* using a third connection via hole 373*b*.

Since the third corresponding electrode 371*b* and the plurality of second split electrodes 372*b* are similar in configuration to the second corresponding electrode 340*b* and the plurality of first split electrodes 350*b*, a detailed description thereof will be omitted below.

The third ground electrode 380*b* may be provided on the upper surface of the multilayered substrate 310*b*, and be electrically connected to the first ground electrode 330*b* and the second ground electrode 360*b*. The cover 390*b* may be provided on the third ground electrode 380*b* to cover a structure, thus serving as a shielding to prevent internal electromagnetic waves from being emitted to the outside.

As described above, the first connection via hole 321*b*, the second connection via hole 331*b*, and the third connection via hole 373*b* provided within the multilayered substrate 310*b* may electrically connect different electrode layers to each other.

Further, a third connecting member 400C may be provided to connect at least one of the plurality of second split electrodes 372*b* and the third corresponding electrode 371*b*, and a fourth connecting member 400D may be provided to connect at least one of the plurality of second split electrodes 372*b* and the third ground electrode 380*a*.

Since the plurality of first split electrodes 350*b* and the plurality of second split electrodes 372*b* are similar in configuration and operation to the plurality of first split electrodes 350*a* according to an embodiment of the present disclosure, they will be briefly described.

That is, at least one of the plurality of first split electrodes 350*b* may be electrically connected to the second corresponding electrode 340*b* through the third corresponding electrode 371*b* and the second split electrode 372*b*, and at least one may be electrically connected to the second ground electrode 360*b* through the third ground electrode 380*b* and the second split electrode 372*b*.

The plurality of first split electrodes 350*b* may have different sizes to adjust the frequency band, and may be adjusted in number to adjust the movement width of the frequency band.

In the above-described PCB cover 300B, the first gap 410 between the second corresponding electrode 340*b* and the plurality of first split electrodes 350*b* may be different from the second gap 420 between the plurality of first split electrodes 350*b* and the second ground electrode 360*b* so as to adjust the movement width of the frequency band.

The plurality of second split electrodes 372*b* serves to form a connecting layer that facilitates the connection of the connecting member so as to solve the problem of the case where it is not easy to connect through the first gap 410 or the second gap 420 due to the size of the first split electrode 350*b*.

In this case, the size of the second split electrode 372*b*, a distance between the second split electrode and the third corresponding electrode 371*b*, and a distance between the second split electrode and the third ground electrode 380*b* do not affect the frequency band movement width. Only through the electrical connection of the electrodes 371*b*, 372*b*, and 380*b*, the plurality of first split electrodes 350*b* may be electrically connected to the second corresponding electrode 340*b* or be electrically connected to the second ground electrode 360*b*. In other words, in order to facilitate the connection of the connecting member, the size of the second split electrode 372*b* and the gaps may be determined as desired without affecting the frequency band width adjustment.

In addition, the plurality of second split electrodes 372*b* may have a different size from the plurality of first split electrodes 350*b* for electrode connection.

Further, in the PCB cover 300B, a third gap between the third corresponding electrode 371*b* and the plurality of second split electrodes 372*b* and a fourth gap between the plurality of second split electrodes 372*b* and the third ground electrode 380*b* may be provided differently from the first gap 410 between the second corresponding electrode 340*b* and the plurality of first split electrodes 350*b* and the second gap 420 between the plurality of first split electrodes 350*b* and the second ground electrode 360*b* so as to adjust the movement width of the frequency band.

The PCB cover 300B may be configured such that a third gap between the third corresponding electrode 371*b* and the plurality of second split electrodes 372*b* may be different from a fourth gap between the plurality of second split electrodes 372*b* and the third ground electrode 380*b*.

In addition, the above-described PCB cover 300B may be provided with a bridge pattern 500 that connects the upper regions of the plurality of resonance elements 200.

For example, the bridge pattern 500 may make transmission zero in the pass band of the filter through coupling with the resonance elements 200 in other spaces through the second corresponding electrode 340*b*, thus improving the skirt characteristics of the filter.

Therefore, according to another embodiment of the present disclosure, the cavity filter includes the plurality of resonance elements arranged in the filter housing and the PCB cover covering the top of the filter housing, includes the multilayered substrate with the plurality of electrode patterns, includes the corresponding electrode corresponding to the upper portion of the resonance element, the ground electrode electrically connected to the housing and the plurality of split electrodes between the corresponding electrode and the ground electrode, and electrically connects at least one of the plurality of split electrodes to any one of the corresponding electrode and the ground electrode, thus allowing the frequency band of the cavity filter to be finely adjusted.

Although certain embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A cavity filter for RF wireless communication, the cavity filter comprising:

a filter housing provided in a form of a box that is open at a top thereof, and including a bottom plate and a side plate extending upwards from an outer end of the bottom plate;

a plurality of resonance elements arranged on the bottom plate provided on the filter housing; and a PCB cover connected to the side plate provided on the filter housing to cover a top of the filter housing, and including a plurality of electrode patterns formed over the plurality of resonance elements to adjust design frequency characteristic, wherein the PCB cover comprises:

a lower substrate provided on an upper portion of the filter housing;

a first corresponding electrode provided on a lower surface of the lower substrate to be spaced apart from the resonance element;

a first ground electrode provided on the lower surface of the lower substrate while being outside the first corresponding electrode to be spaced apart therefrom, and electrically connected to the filter housing;

a second corresponding electrode provided on an upper surface of the lower substrate to be electrically connected to the first corresponding electrode;

a plurality of first split electrodes provided on the upper surface of the lower substrate while being outside the second corresponding electrode to be spaced apart therefrom;

a second ground electrode provided on the upper surface of the lower substrate while being outside the plurality of first split electrodes to be spaced apart therefrom, and electrically connected to the first ground electrode;

an upper substrate provided on the lower substrate, and provided on an upper surface of the second ground electrode;

a third ground electrode provided on an upper surface of the upper substrate, and electrically connected to the first ground electrode and the second ground electrode; and a cover provided on the third ground electrode to cover a structure.

2. The cavity filter of claim 1, wherein the PCB cover comprises a bridge pattern that connects upper regions of the plurality of resonance elements.

3. The cavity filter of claim 1, wherein the lower substrate and the upper substrate are integrally provided on the upper portion of the filter housing.

4. The cavity filter of claim 1, wherein the PCB cover is configured such that a first gap between the second corresponding electrode and the plurality of first split electrodes is different from a second gap between the plurality of first split electrodes and the second ground electrode so as to adjust a movement width of the frequency band.

5. The cavity filter of claim 1, wherein at least one of the plurality of first split electrodes is electrically connected to the second corresponding electrode.

6. The cavity filter of claim 1, wherein the plurality of first split electrodes has different electrode sizes to adjust a frequency band.

7. The cavity filter of claim 1, wherein at least one of the plurality of first split electrodes is electrically connected to the second ground electrode.

8. A cavity filter for RF wireless communication, the cavity filter comprising:

a filter housing provided in a form of a box that is open at a top thereof, and including a bottom plate and a side plate extending upwards from an outer end of the bottom plate;

a plurality of resonance elements arranged on the bottom plate provided on the filter housing; and a PCB cover connected to the side plate provided on the filter housing to cover a top of the filter housing, and including a plurality of electrode patterns formed over the plurality of resonance elements to adjust design frequency characteristic, wherein the PCB cover comprises:

a multilayered substrate provided on an upper portion of the filter housing;

a first corresponding electrode provided on a lower surface of the multilayered substrate to be spaced apart from the resonance element;

a first ground electrode provided on the lower surface of the multilayered substrate while being outside the first corresponding electrode to be spaced apart therefrom, and electrically connected to the filter housing;

a second corresponding electrode provided as an inner layer of the multilayered substrate to be electrically connected to the first corresponding electrode;

a plurality of first split electrodes provided as the inner layer of the multilayered substrate while being outside the second corresponding electrode to be spaced apart therefrom;

a second ground electrode provided as the inner layer of the multilayered substrate while being outside the plurality of first split electrodes to be spaced apart therefrom, and electrically connected to the first ground electrode;

a third corresponding electrode provided on an upper surface of the multilayered substrate, and electrically connected to the second ground electrode;

a plurality of second split electrodes provided on the upper surface of the multilayered substrate while being outside the third corresponding electrode to be spaced apart therefrom, and electrically connected to the plurality of first split electrodes;

a third ground electrode provided on the upper surface of the multilayered substrate, and electrically connected to the first ground electrode and the second ground electrode; and a cover provided on the third ground electrode to cover a structure.

9. The cavity filter of claim 8, wherein at least one of the plurality of first split electrodes is electrically connected to the second ground electrode.

10. The cavity filter of claim 8, wherein the plurality of first split electrodes has different electrode sizes to adjust a frequency band.

11. The cavity filter of claim 8, wherein at least one of the plurality of first split electrodes is electrically connected to the second corresponding electrode.

12. The cavity filter of claim 8, wherein the PCB cover is configured such that a first gap between the second corresponding electrode and the plurality of first split electrodes is different from a second gap between the plurality of first split electrodes and the second ground electrode so as to adjust a movement width of the frequency band.

13. The cavity filter of claim 8, wherein the PCB cover is configured such that a third gap between the third corresponding electrode and the plurality of second split electrodes and a fourth gap between the plurality of second split electrodes and the third ground electrode are provided differently from the first gap between the second corresponding electrode and the plurality of first split electrodes and the second gap between the plurality of first split electrodes and the second ground electrode so as to adjust the movement width of the frequency band.

14. The cavity filter of claim 8, wherein the PCB cover comprises a bridge pattern that connects upper regions of the plurality of resonance elements.

15. The cavity filter of claim 8, wherein at least one of the plurality of second split electrodes is electrically connected to the third corresponding electrode.

16. The cavity filter of claim 8, wherein at least one of the plurality of second split electrodes is electrically connected to the third ground electrode.

17. The cavity filter of claim 8, wherein the plurality of second split electrodes has a different size from the first split electrodes for electrode connection.

* * * * *